(12) United States Patent
Lee et al.

(10) Patent No.: US 10,137,402 B2
(45) Date of Patent: Nov. 27, 2018

(54) GAS CONCENTRATION DEVICE

(71) Applicant: OXUS CO., LTD., Gyeonggi-do (KR)

(72) Inventors: Tae Soo Lee, Gyeonggi-do (KR);
Hyeon Seong Kim, Gyeonggi-do (KR);
Shin Kyu Han, Seoul (KR); Seung Kwon Oh, Hanam-si (KR); Loren Mitchell Thompson, Lapeer, MI (US)

(73) Assignee: OXUS CO., LTD., Gyeonggi-do (KR)

( * ) Notice: Subject to any disclaimer, the term of this patent is extended or adjusted under 35 U.S.C. 154(b) by 115 days.

(21) Appl. No.: 15/433,630

(22) Filed: Feb. 15, 2017

(65) Prior Publication Data
US 2018/0229176 A1    Aug. 16, 2018

(51) Int. Cl.
*B01D 53/047* (2006.01)
*B01D 53/04* (2006.01)

(52) U.S. Cl.
CPC ....... *B01D 53/047* (2013.01); *B01D 53/0423* (2013.01); *B01D 2253/108* (2013.01); *B01D 2256/12* (2013.01); *B01D 2257/102* (2013.01); *B01D 2259/402* (2013.01); *B01D 2259/40007* (2013.01); *B01D 2259/40035* (2013.01); *B01D 2259/4533* (2013.01)

(58) Field of Classification Search
CPC .............. B01D 53/047; B01D 53/0423; B01D 2253/108; B01D 2256/12; B01D 2257/102; B01D 2259/40007; B01D 2259/40035; B01D 2259/402; B01D 2259/4533

USPC .......................................................... 96/121
See application file for complete search history.

(56) References Cited

U.S. PATENT DOCUMENTS

| | | | | |
|---|---|---|---|---|
| 5,071,453 A * | 12/1991 | Hradek | .................... | A62B 7/14 95/19 |
| 5,354,361 A * | 10/1994 | Coffield | ............... | B01D 53/047 95/103 |
| 5,988,165 A * | 11/1999 | Richey, II | ............. | A61M 16/10 128/204.22 |
| 7,550,031 B2 * | 6/2009 | Hunter | .................. | B01D 53/04 95/130 |

* cited by examiner

*Primary Examiner* — Frank M Lawrence, Jr.
(74) *Attorney, Agent, or Firm* — Rabin & Berdo, P.C.

(57) ABSTRACT

A gas concentration device according to an embodiment of the present invention includes: an air supplier supplying pressurized air; a plurality of adsorption beds which separate pressurized air supplied from the air supplier into product gas and purge gas by a pressure swing adsorption method and discharge the separated product gas and purge gas; a flow passage regulating valve unit which regulates flow passages so as to allow the pressurized air to be supplied to the adsorption bed from the air supplier and so as to reduce pressure of the adsorption bed so that a nitrogen adsorption process and a nitrogen desorption process are alternately performed; and a pressure boosting unit which is configured to be fed with the purge gas and the product gas discharged from the adsorption bed and is configured to pressurize the product gas in multi-stage sequentially using the purge gas and the product gas.

11 Claims, 7 Drawing Sheets

GAS CONCENTRATION DEVICE

TECHNICAL FIELD

The present invention relates to a gas concentration device in a pressure swing adsorption type.

BACKGROUND ART

The gas concentration device is a device for separation and concentration of oxygen or nitrogen from air and is widely used for home use, industrial use, medical use or the like.

Various types of the gas concentration device are used, and among of them the pressure swing adsorption (PSA) type gas concentration device increases the concentration of oxygen by adsorbing nitrogen in the air by an absorbent based on the principle of separating and concentrating oxygen from the pressurized air using the absorbent. Since the PSA method uses only the pressurized air and the absorbent, it does not emit pollutants and can be easily used.

It is advantageous to lower the pressure of the pressurized air which is supplied during the pressure swing adsorption process in terms of energy consumption, noise, the size of the device, the durability and the like. Meanwhile, on the other hand, if the pressure of the pressurized air becomes lower, there is a drawback that the pressure of the final product gas (for example, oxygen) becomes also lower. Since the gas which is used for medical or industrial purpose is generally required to have necessary pressure level, if the pressure of the pressurized air is lower, the pressure of the final product gas also becomes lower. Accordingly, a method of increasing the pressure of the final product gas without increasing the pressure of the pressurized air is required.

DETAILED DESCRIPTION OF THE INVENTION

Technical Problem

The present invention has been made in an effort to provide a gas concentration device which can increase the pressure of the final product gas without increasing the pressure of the pressurized air.

Technical Solution

A gas concentration device according to an embodiment of the present invention includes: an air supplier supplying pressurized air; a plurality of adsorption beds which separate pressurized air supplied from the air supplier into product gas and purge gas by a pressure swing adsorption method and discharge the separated product gas and purge gas; a flow passage regulating valve unit which regulates flow passages so as to allow the pressurized air to be supplied to the adsorption bed from the air supplier and so as to reduce pressure of the adsorption bed so that a nitrogen adsorption process and a nitrogen desorption process are alternately performed; and a pressure boosting unit which is configured to be fed with the purge gas and the product gas discharged from the adsorption bed and is configured to pressurize the product gas in multi-stage sequentially using the purge gas and the product gas.

The pressure boosting unit may include: a first cylinder, a second cylinder and a third cylinder respectively defining a first cylinder bore, a second cylinder bore and a third cylinder bore which are sequentially disposed; a first piston, a second piston and a third piston which are respectively movably disposed in the first cylinder bore, the second cylinder bore and the third cylinder bore and are connected to one another so as to move together; a purge gas discharging passage for discharging the purge gas; an on/off valve for selectively allowing discharging of the purge gas depending on an on/off state thereof; and a product gas discharging passage for discharging the product gas. The first cylinder bore may be configured to be fed respectively with the product gas and the purge gas in both spaces disposed on both sides of the first piston. The second cylinder bore may be configured to be fed with the purge gas in one of both spaces disposed on both sides of the second piston. The third cylinder bore may be configured to be fed with the pressurized product gas supplied from the first cylinder bore and to discharge the supplied product gas.

The first piston may be configured to partition the first cylinder bore to form a first product gas chamber into which the product gas is fed and a first purge gas chamber into which the purge gas is fed. The second piston may be configured to partition the second cylinder bore to form a second purge gas chamber into which the purge gas is fed. The third piston may be configured to partition the third cylinder bore to form a second product gas chamber into which the product gas from the first product gas chamber is fed.

The plurality of adsorption beds may include a first adsorption bed and a second adsorption bed. The pressure boosting unit may operate to repeatedly perform multi-staged pressurization process including: a process that the product gas in the first product gas chamber is pressurized by a force acting on the first and second pistons by the purge gas discharged from the second adsorption bed in an off state of the on/off valve so as to move to the second product gas chamber; a process that a portion of the purge gas is discharged by a pressure of the product gas in the first product gas chamber, which is supplied from the second adsorption bed, in an on state of the on/off valve and the product gas in the second product gas chamber is pressurized so as to be partially discharged; a process that the product gas in the second product gas chamber is pressurized by a force acting on the first piston by the product gas discharged from the first adsorption bed in an on state of the on/off valve so as to be discharged and at the same time the purge gas in the first and second purge gas chambers is discharged; a process that the product gas in the first product gas chamber is pressurized by a force acting on the first and second pistons by the purge gas discharged from the first adsorption bed in an off state of the on/off valve so as to move to the second product gas chamber; a process that a portion of the purge gas is discharged by a pressure of the product gas in the first product gas chamber, which is supplied from the first adsorption bed, in an on state of the on/off valve and the product gas in the second product gas chamber is pressurized so as to be partially discharged; and a process that the product gas in the second product gas chamber is pressurized by a force acting on the first piston by the product gas discharged from the second adsorption bed in an on state of the on/off valve so as to be discharged and at the same time the purge gas in the first and second purge gas chambers is discharged.

The first to third pistons may be connected to one another by a piston rod, and wherein the piston rod defines a product gas moving passage through which the product gas discharged from the first product gas chamber moves to the second product gas chamber.

The pressure boosting unit may further include: an external cylinder surrounding the third cylinder so as to form a third purge gas chamber around the third cylinder; a first purge gas moving passage connected to the first purge gas chamber; and a second purge gas moving passage connected to the second purge gas chamber. The purge gas discharging passage may be connected to the third purge gas chamber.

The first and second purge gas moving passages may be merged to form a third purge gas moving passage, and the on/off valve may be installed in the third purge gas moving passage.

The pressure boosting unit may further include a check valve which is installed in the product gas moving passage to allow the product gas to flow from the first product gas chamber to the second product gas chamber while preventing the product gas from flowing in an opposite direction.

A diameter of the third cylinder may be less than a diameter of the first cylinder.

The first piston and the second piston may be configured such that a force acting on the first piston and the second piston by the pressure of the purge gas is greater than a force acting on the first piston by the pressure of the product gas.

A gas concentration device according to an embodiment of the present invention includes: an air supplier supplying pressurized air; a plurality of adsorption beds which separate pressurized air supplied from the air supplier into product gas and purge gas by a pressure swing adsorption method and discharge the separated product gas and purge gas; a flow passage regulating valve unit which regulates flow passages so as to allow the pressurized air to be supplied to the adsorption bed from the air supplier and so as to reduce pressure of the adsorption bed so that a nitrogen adsorption process and a nitrogen desorption process are alternately performed; and a pressure boosting unit which is configured to be fed with the purge gas and the product gas discharged from the adsorption bed and is configured to pressurize the product gas in multi-stage sequentially using the purge gas and the product gas. The pressure boosting unit comprises: a first cylinder, a second cylinder and a third cylinder respectively defining a first cylinder bore, a second cylinder bore and a third cylinder bore which are sequentially disposed; and a first piston, a second piston and a third piston which are respectively movably disposed in the first cylinder bore, the second cylinder bore and the third cylinder bore and are connected to one another so as to move together. The first cylinder bore is configured to be fed respectively with the product gas and the purge gas in both spaces disposed on both sides of the first piston, wherein the second cylinder bore is configured to be fed with the purge gas in one of both spaces disposed on both sides of the second piston, and wherein the third cylinder bore is configured to be fed with the pressurized product gas supplied from the first cylinder bore and to discharge the supplied product gas. The first piston the first piston is configured to partition the first cylinder bore to form a first product gas chamber into which the product gas is fed and a first purge gas chamber into which the purge gas is fed, wherein the second piston is configured to partition the second cylinder bore to form a second purge gas chamber into which the purge gas is fed, and wherein the third piston is configured to partition the third cylinder bore to form a second product gas chamber into which the product gas from the first product gas chamber is fed. The pressure boosting unit further comprises: an external cylinder surrounding the third cylinder so as to form a third purge gas chamber around the third cylinder; a first purge gas moving passage connected to the first purge gas chamber; a second purge gas moving passage connected to the second purge gas chamber; an on/off valve which selectively allows the purge gas to flow from the first and second purge gas moving passages; and a third purge gas moving passage connecting the on/off valve and the third purge gas chamber; and a purge gas discharging passage through which the purge gas discharged from the third purge gas chamber flows. The plurality of adsorption beds comprises a first adsorption bed and a second adsorption bed. The pressure boosting unit operates to repeatedly perform multi-staged pressurization process including: a process that the product gas in the first product gas chamber is pressurized by a force acting on the first and second pistons by the purge gas discharged from the second adsorption bed in an off state of the on/off valve so as to move to the second product gas chamber; a process that a portion of the purge gas is discharged by a pressure of the product gas in the first product gas chamber, which is supplied from the second adsorption bed, in an on state of the on/off valve and the product gas in the second product gas chamber is pressurized so as to be partially discharged; a process that the product gas in the second product gas chamber is pressurized by a force acting on the first piston by the product gas discharged from the first adsorption bed in an on state of the on/off valve so as to be discharged and at the same time the purge gas in the first and second purge gas chambers is discharged; a process that the product gas in the first product gas chamber is pressurized by a force acting on the first and second pistons by the purge gas discharged from the first adsorption bed in an off state of the on/off valve so as to move to the second product gas chamber; a process that a portion of the purge gas is discharged by a pressure of the product gas in the first product gas chamber, which is supplied from the first adsorption bed, in an on state of the on/off valve and the product gas in the second product gas chamber is pressurized so as to be partially discharged; and a process that the product gas in the second product gas chamber is pressurized by a force acting on the first piston by the product gas discharged from the second adsorption bed in an on state of the on/off valve so as to be discharged and at the same time the purge gas in the first and second purge gas chambers is discharged.

Advantageous Effects

According to the present invention, the product gas is additionally pressurized by the pressure of the purge gas, so the pressure of the product gas can be increased without increasing the pressure of the pressurized gas.

DETAILED DESCRIPTION OF THE EMBODIMENTS

Embodiments of the present invention will be described in detail with reference to the accompanying drawings hereinafter.

The gas concentration device according to an embodiment of the present invention may be configured to separate and store a product gas, e.g., oxygen from air and to discharge the remaining gas as a purge gas, e.g., a nitrogen concentrated gas. Hereinafter, a description will be made for a case that the product gas is oxygen concentrated gas (hereinafter simply referred to oxygen) and the purge gas is a nitrogen concentrated gas, and the product gas and the purge gas are respectively referred to oxygen and nitrogen.

Figure 1:
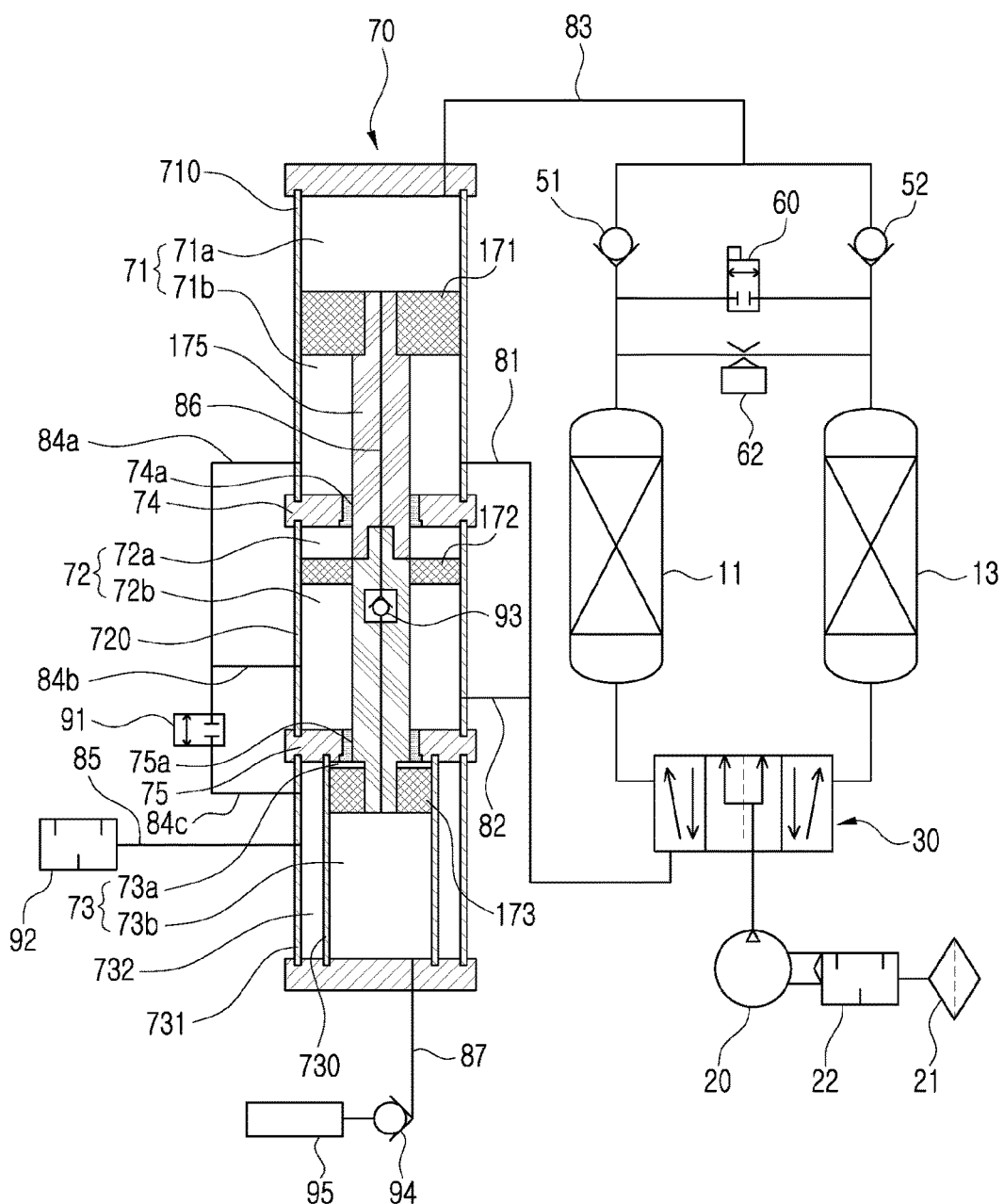
FIG. 1 is a schematic block diagram of a gas concentration device according to an embodiment of the present invention.

Referring to FIG. 1, a plurality of adsorption beds 11 and 13 which are respectively filled with adsorbents which selectively adsorb nitrogen with respect to oxygen in a pressure swing adsorption method are provided. Although two adsorption beds, i.e., a first and a second adsorption beds 11 and 13 are shown as an example, the number of the adsorption is not limited thereto.

The adsorption beds 11 and 13 may be formed as a shape of a tower, and may have openings at a top and a bottom through which gas inflows and outflows, and for example, air inflows through a lower opening and passes through the absorbent to move upwardly and then outflows through an upper opening. The absorbent provided in the adsorption beds 11 and 13 may be made of material having a property of adsorbing nitrogen better than oxygen among nitrogen and oxygen contained in air, and for example may be made of synthetic Zeolite.

An air supplier 20 supplies a pressurized air to the adsorption beds 11 and 13. The air supplier 20 may be a compressor which can pressurize air and can supply the pressurized air. At this time, an air filter 21 and a silencer 22 may be disposed at an upstream of the air supplier 20.

A flow passage regulating valve unit 30 is interposed between the air supplier 20 and the adsorption beds 11 and 13 and plays a role of regulating flow passages for alternately performing a nitrogen adsorption process and a nitrogen desorption. For example, the flow passage regulating unit 30 may form a flow passage through which pressurized air is supplied from the air supplier 20 to one of the adsorption beds 11 and 13 so as to allow a nitrogen adsorption process to be performed in the corresponding adsorption bed, and may form a flow passage through which nitrogen (purge gas) is discharged from one of the adsorption beds 11 and 13 so as to allow a nitrogen desorption process to be performed in the corresponding adsorption bed. Also, the flow passage regulating valve unit 30 may form a flow passage communicating lower portions of the adsorption beds 11 and 13 so as to allow a pressure equalization between the lower portions of the two adsorption beds 11 and 13 to be performed. The structure and the functions of the flow passage regulating valve unit 30 are equal to those of the conventional art, so further detailed descriptions thereof will be omitted.

As shown in FIG. 1, the pressurized air discharged from the air supplier 20 is fed into the adsorption beds 11 and 13 via the flow passage regulating unit 30.

Also, as shown in FIG. 1, discharge passages for discharging the product gas, i.e., oxygen from the adsorption beds 11 and 13 are respectively connected to upper openings of the adsorption beds 11 and 13, and check valves 51 and 2 for allowing the oxygen to flow in one way are respectively installed to the discharge passages. Further, an on/off valve 60 may be installed in a passage connecting the two discharge passages, and an orifice 62 may be installed in a passage connecting the two discharge passages. A pressure equalization between two upper portions of the two adsorption beds 11 and 13 may be performed during the nitrogen adsorption process and the nitrogen desorption process by the on/off valve 60 and the orifice 62.

A pressure boosting unit 70 which alternately pressurizes oxygen, i.e., the product gas, and nitrogen, i.e., the purge gas using nitrogen and oxygen discharged from the adsorption beds 11 and 13 is provided.

The pressure boosting unit 70 is formed to be fed with nitrogen and oxygen discharged from the adsorption beds 11 and 13 and to discharge the same. As shown in FIG. 1, the pressure boosting unit 70 may be realized in a type of cylinder-piston configuration, and is configured to be fed with nitrogen via the flow passage regulating valve unit 30 which is disposed at an upstream of the adsorption beds 11 and 13 and to be fed with oxygen which is discharged from downstream ends of the adsorption beds 11 and 13. For example, the pressure boosting unit 70 is configured to be fed with nitrogen via nitrogen feeding passages 81 and 82 which are connected to the flow passage regulating valve unit 70 and to be fed with oxygen via an oxygen feeding passage 83 which is connected to the check valves 51 and 52 which are installed in the discharge passages of the adsorption beds 11 and 13.

The pressure boosting unit 70 includes a first, a second and a third cylinder 710, 720 and 730 which define respectively a first, a second and a third cylinder bore 71, 72 and 73 which are sequentially disposed. As shown in FIG. 1, the first to third cylinder bores 71, 72 and 73 may be sequentially in a downward direction, and may be separated from neighboring one by partitioning walls 74 and 75 respectively.

A first, a second and a third piston 171, 172 and 173 are reciprocally movably disposed in the first, the second and the third cylinder bore 71, 72 and 73 respectively. The first cylinder bore 71 is variably partitioned into two spaces 71a and 71b, which are vertically disposed, by the first piston 171. Similarly, the second cylinder bore 72 is variably partitioned into two spaces 72a and 72b by the second piston 172, and the third cylinder bore 73 are variably partitioned into two spaces 73a and 73b by the third piston 173.

At this time, the first to third pistons 171, 172 and 173 are connected to one another by a piston rod 175 so as to move together as one body. Through holes 74a and 75a are respectively formed in the partitioning walls 75 and 75, and the piston rod 175 is inserted into the through holes 74a and 75a to be movable in a vertical direction. At this time, the outer circumferential surface of the piston rod 175 sealingly contacts surfaces defining the through holes 74a and 75a so as to form sealings between the cylinder bores.

Meanwhile, referring to FIG. 1, the first cylinder bore 71 is configured such that the product gas and the purge gas are respectively fed into and discharged from both spaces 71a and 71b. Hereinafter, the space designated by reference numeral 71a is called a first product gas chamber, and the space designated by reference numeral 71b is called a first purge gas chamber. The first product gas chamber 71a is connected to the oxygen feeding passage 83 so as to be fed with oxygen, and the first purge gas chamber 71b is connected to the nitrogen feeding passage 81 so as to be fed with nitrogen. Thus, the first piston 171 is forced to move downwardly by the pressure of the oxygen fed into the first product gas chamber 71a and is forced to move upwardly by the pressure of the nitrogen fed into the first purge gas chamber 71b.

The second cylinder bore 72 is configured such that the nitrogen is fed thereinto and discharged therefrom in a state that the second piston 172 is forced to move in a direction (upward direction in FIG. 1) in which the product gas of the first cylinder 71 is pressurized by the nitrogen fed thereinto. Referring to FIG. 1, the second cylinder bore 72 is configured such that a space 72b beneath the second piston 172 is connected to the nitrogen feeding passage 82 so as to be fed with nitrogen. Hereinafter, the space designated by the reference numeral 72b is called a second purge gas chamber. Thus, the second piston 172 is forced to move upwardly by the pressure of nitrogen fed into the second purge gas chamber 72b. If nitrogen is fed into the first and the second purge gas chamber 71b and 72b via the nitrogen feeding passages 81 and 82 by operations of the flow passage regulating valve unit 30, two forces respectively acting on the first piston 171 and the second piston 172 by the pressure of the fed nitrogen have the same direction with one another, and the resultant force of these two forces acts on the first and the second pistons 171 and 172 which are connected to one another by the piston rod 175. Meanwhile, the space 72a above the second piston 172 may be communicated with outer space so that air can freely move in both directions.

It is configured that oxygen discharged from the first product gas chamber 71a is supplied to a space 73b, whose volume becomes smaller by the movement of the piston rod 175 by the oxygen fed into the first product gas chamber 71a, among two spaces 73a and 73b of the third cylinder bore 73 which are divided by the third piston 173. Hereinafter, the space designated by the reference numeral 73b is called a second product gas chamber. For example, as shown in schematically shown in FIG. 1, the first product gas chamber 71a and the second product gas chamber 73b are communicated with one another via a product gas moving passage 175 which is formed in the piston rod 175. Meanwhile, a space 73a above the third piston 173 may be communicated with outer space so that air can freely move in both directions.

As shown in FIG. 1, an external cylinder 731 surrounding the third cylinder 730 to form a third purge gas chamber 732 around the third cylinder 730. That is, the third purge gas chamber 732 is formed between the third cylinder 730 and the external cylinder 731. The third purge gas chamber 732 is connected to the first and the second purge gas chambers 71b and 72b to be fed with nitrogen discharged from the first and the second purge gas chambers 71b and 72b. Accordingly, since the third purge gas chamber 732 filled with nitrogen surrounds the second product gas chamber 73b, noise can be reduced and cooling effect can be obtained.

As shown in FIG. 1, the first purge gas chamber 71b and the second purge gas chamber 72b are respectively connected to a first purge gas moving passage 84 and a second purge gas moving passage 84b, and the first and the second purge gas moving passages 84a and 84b are merged to one another and is then connected to an on/off valve 91. The on/off valve 91 is connected to the third purge gas chamber 732 via a third purge gas moving passage 84c. Accordingly, in case that the on/off valve 91 is open, the purge gas of the first and the second purge gas chambers 71b and 72b can be moved to the third purge gas chamber 732 via the on/off valve 91.

The third purge gas chamber 732 is connected to the purge gas discharging passage 85. The purge gas of the third purge gas chamber 732 can be discharged to the outside via the purge gas discharging passage 85. At this time, a silencer 92 may be installed in the purge gas discharging passage 85.

Meanwhile, the second product gas chamber 73b is connected to a product gas discharging passage 87 for discharging the product gas.

A check valve 93 may be installed in the product gas moving passage 86, and the check valve 93 allows the oxygen discharged from the first product gas chamber 71a to flow into the second product gas chamber 73b via the product gas moving passage 86 while prohibiting the product gas from flowing in a reverse direction.

Meanwhile, the product gas discharging passage 87, which is connected to the second product gas chamber 73b, may be connected to an oxygen tank 95, and a check valve 94 may be installed in the product gas discharging passage 87. The check valve 94 allows the oxygen discharged from the third cylinder bore 73 to flow into the oxygen tank 95 via the product gas discharging passage 87 while prohibiting the product gas from flowing in a reverse direction.

Meanwhile, not shown in the drawings, a control unit for controlling the flow passage regulating valve unit 30, the on/off valves 60 and 91 and the like is provided, and the control unit may operate to perform a control logic for oxygen concentration processes. For example, the control unit may include a microprocessor, a memory and related hardware and software. Hereinafter, the operation of the gas concentration device according to an embodiment of the present invention will be described with reference to FIG. 2 to FIG. 7. The pressurization of oxygen, i.e., the product gas using nitrogen, i.e., the purge gas is performed by repeatedly performing the processes of FIG. 2 to FIG. 7. According to the present invention, the flow passage regulating valve unit 30 is configured to be fed with the purge gas and the product gas discharged from the adsorption beds 11 and 13 and to discharge the fed gases, and is configured to pressurize the product gas in multi-stage using the fed purge gas and the fed product gas.

Figure 2:
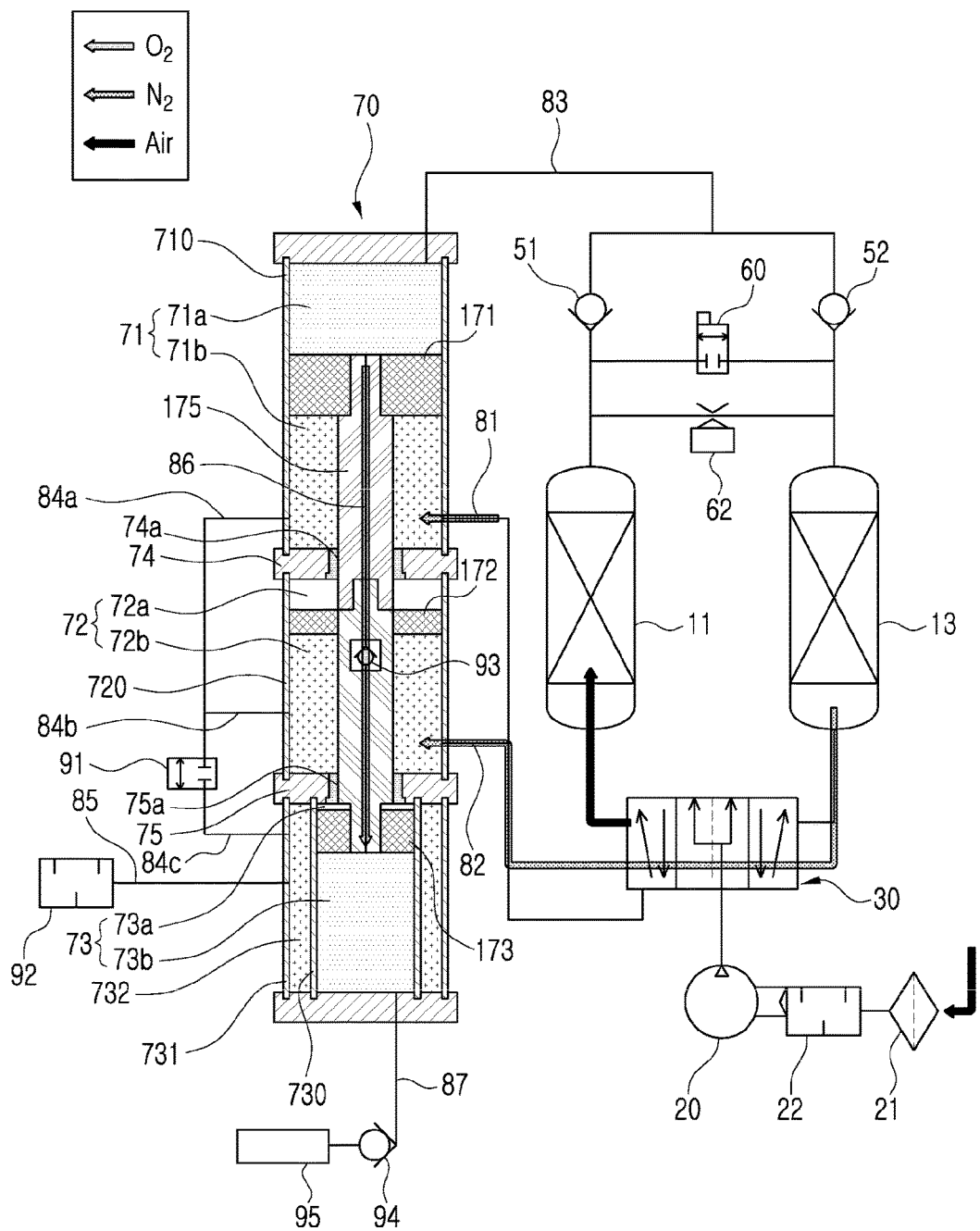
FIG. 2 is a drawing showing a state in which a product gas of a first product gas chamber is pressurized by a purge gas discharged from a second adsorption bed to move a second product gas chamber in a closed state of an on/off valve in a pressure boosting unit of a gas concentration device according to an embodiment of the pressure invention.

FIG. 2 is a drawing showing a state in which a product gas of a first product gas chamber is pressurized by a purge gas discharged from a second adsorption bed to move a second product gas chamber in a closed state of an on/off valve in a pressure boosting unit of a gas concentration device according to an embodiment of the pressure invention. A process of FIG. 2 is performed after the process of FIG. 7.

In detail, FIG. 2 shows a state in which nitrogen discharged from the second adsorption bed 13 has been fed into the first and the second purge gas chambers 71b and 72b, and the first to third pistons 171, 172 and 173 are located at a top dead point. That is, nitrogen is supplied to the first and the second purge gas chambers 71b and 72b via the purge gas feeding passages 81 and 82 after the process of FIG. 7, so the first to third pistons 171, 172 and 173 moves upwardly by the pressure of nitrogen to reach the point shown in FIG. 2. During this process, the on/off valve 91 is controlled to be off. At this time, a nitrogen adsorption process is performed in the first adsorption bed 11 and a nitrogen desorption process is performed in the second adsorption bed 13.

At this time, the first and the second pistons 171 and 172 may be formed such that the sum of forces acting on the first and the second pistons 171 and 172 by the pressure of nitrogen is greater than the force acting on the first piston 171 by the pressure of oxygen. Accordingly, the force due to the pressure of nitrogen is greater than the force due to the pressure of oxygen so that the first to third pistons 171, 172 and 173 move together upwardly. For example, the first piston 171 and the second piston 172 may have the same sectional size, and in a state of FIG. 1, the pressure of oxygen may be about 2.5 bar and the pressure of oxygen may be about 1.5 bar.

Figure 7:
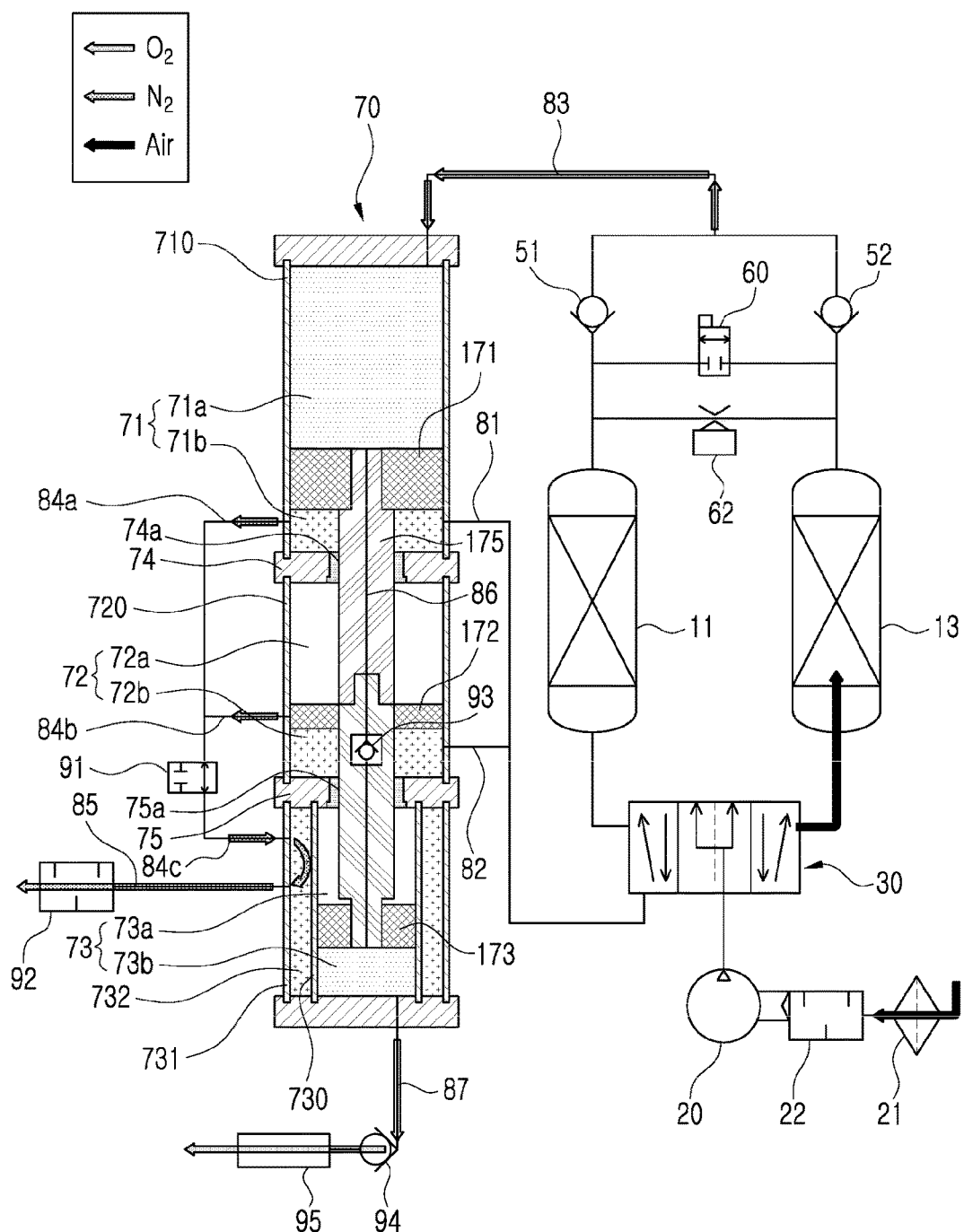
FIG. 7 is a drawing showing a state in which a purge gas and a product gas of a second product gas chamber is pressurized by a product gas which is discharged from a second adsorption bed to be discharged in an open state of an on/off valve in a pressure boosting unit of a gas concentration device according to an embodiment of the pressure invention.

Accordingly, while the first to third pistons 171, 172 and 173 move upwardly during the transition from the state of FIG. 7 to the state of FIG. 2, the oxygen in the first product gas chamber 71a is pressurized, and the oxygen which is being pressurized is urged to move to the second product gas chamber 73b.

Figure 3:
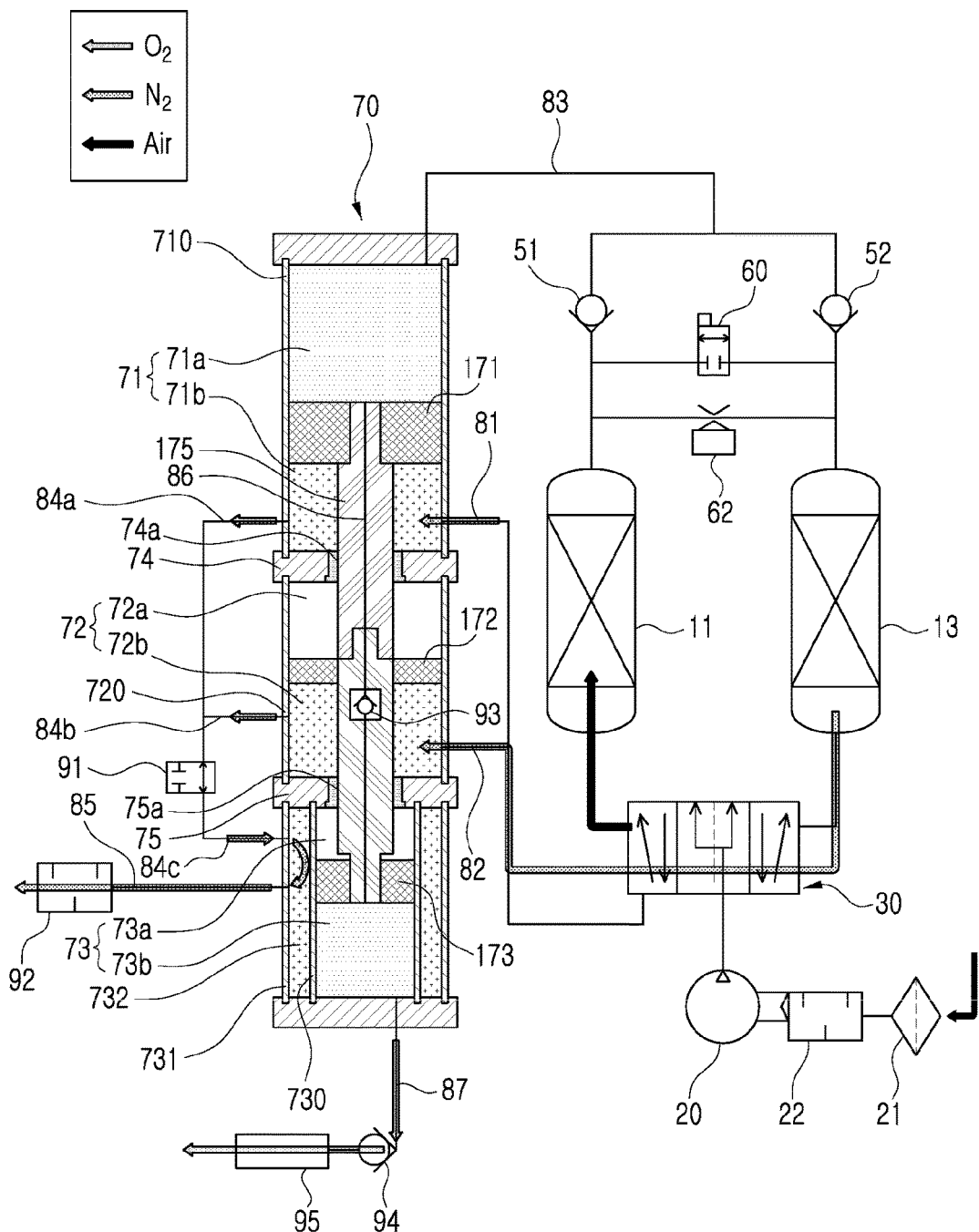
FIG. 3 is a drawing showing a state in which a purge gas is partially discharged by a pressure of a product gas of a first product gas chamber in an open state of an on/off valve in a pressure boosting unit of a gas concentration device according to an embodiment of the pressure invention.

FIG. 3 is a drawing showing a state in which a purge gas is partially discharged by a pressure of a product gas of a first product gas chamber in an open state of an on/off valve in a pressure boosting unit of a gas concentration device according to an embodiment of the pressure invention. The state of FIG. 3 is performed after the state of FIG. 2, and during the transition from the state of FIG. 2 to the state of FIG. 3, a portion of the purge gas in the first and the second purge gas chambers 71b and 72b moves to the third purge gas chamber 732 and a portion of the purge gas may be discharged to the outside via the purge gas discharging passage 85.

If the on/off valve 91 becomes open at the state of FIG. 2, the balance of forces acting on the pistons 171, 172 and 173 by the product gas and the purge gas collapses, so the pistons 171, 172 and 173 move downwardly by the pressure of the product gas and thereby a portion of the purge gas is discharged to the outside. At this time, the product gas in the second product gas chamber 73b is also pressurized by the movement of the pistons 171, 172 and 173, so a portion thereof may be discharged to the outside via the product gas discharging passage 87. During the transition from the state of FIG. 2 to the state of FIG. 3, a nitrogen adsorption process may be performed in the first adsorption bed 11, and a portion of nitrogen remaining in the second adsorption bed 13 may move to the first and the second nitrogen gas chambers 71b and 72b due to pressure change.

Figure 4:
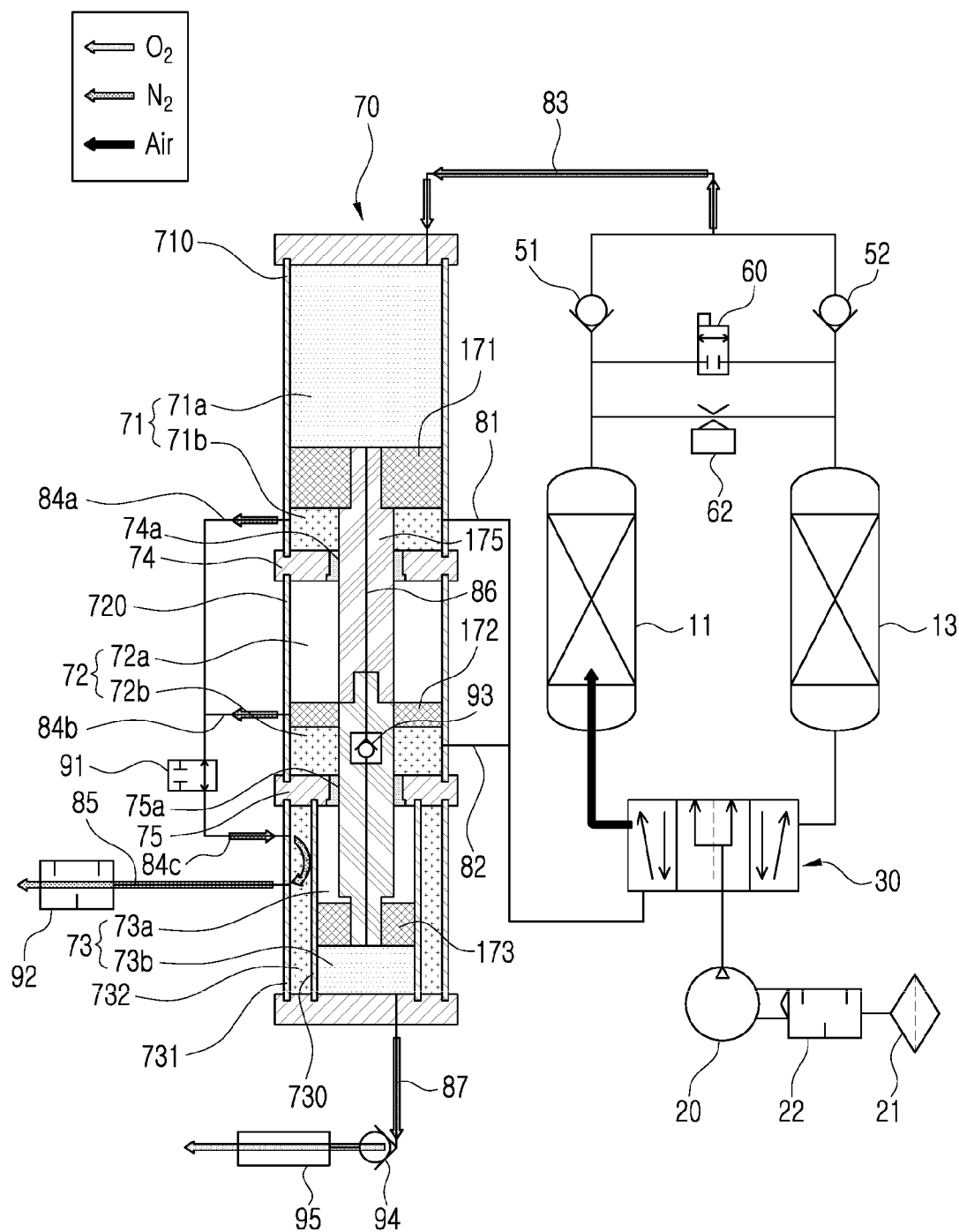
FIG. 4 is a drawing showing a state in which a purge gas and a product gas of a second product gas chamber is pressurized by a product gas which is discharged from a first adsorption bed to be discharged in an open state of an on/off valve in a pressure boosting unit of a gas concentration device according to an embodiment of the pressure invention.

FIG. 4 is a drawing showing a state in which a purge gas and a product gas of a second product gas chamber is pressurized by a product gas which is discharged from a first adsorption bed to be discharged in an open state of an on/off valve in a pressure boosting unit of a gas concentration device according to an embodiment of the pressure invention. The state of FIG. 4 is performed after the state of FIG. 3, and during transition from the state of FIG. 3 to the state of FIG. 4 nitrogen of the pressure boosting unit 70 is discharged and the pressurized oxygen moves to the oxygen tank 95. During this process, the on/off valve 91 is controlled to be on.

In detail, FIG. 4 shows a state in which oxygen discharged from the first adsorption bed 11 has been supplied to the first product gas chamber 71a, and the first to third pistons 171, 172 and 173 are located at a bottom dead point. If oxygen is discharged from the first adsorption bed 11 at the state of FIG. 3, oxygen pressure of the first product gas chamber 71a increases, and thus the force due to oxygen pressure becomes greater than the force due to nitrogen pressure so that the first to third pistons 171, 172 and 173 move downwardly to reach the state of FIG. 4. During this process the on/off valve 91 is maintained to be on, so nitrogen is discharged via the purge gas discharging passage 85 and oxygen in the second product gas chamber 73b is pressurized so as to be discharged via the product gas discharging passage 87 to the oxygen tank 95.

Figure 5:
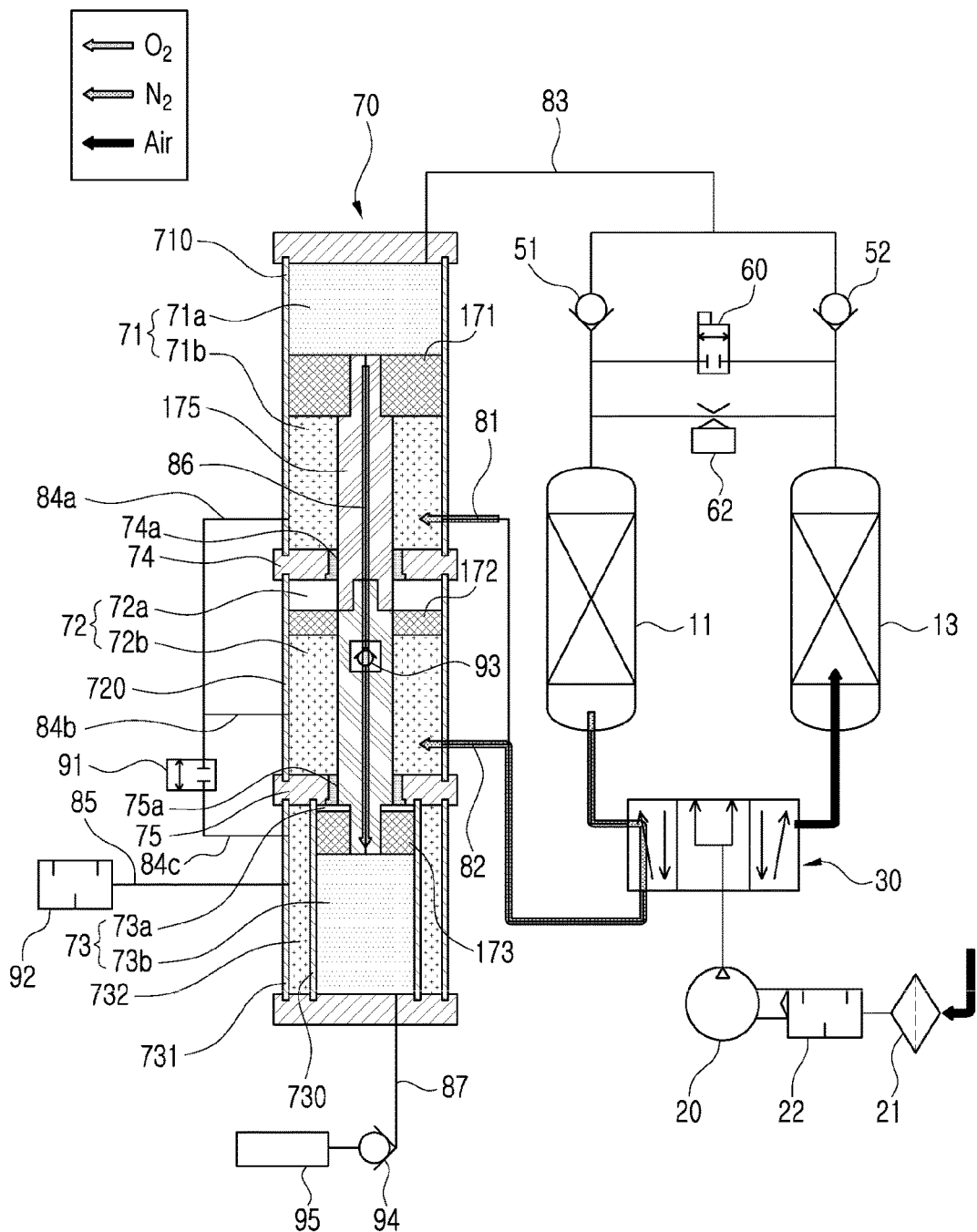
FIG. 5 is a drawing showing a state in which a product gas of a first product gas chamber is pressurized by a purge gas discharged from a first adsorption bed to move a second product gas chamber in a closed state of an on/off valve in a pressure boosting unit of a gas concentration device according to an embodiment of the pressure invention.

FIG. 5 is a drawing showing a state in which a product gas of a first product gas chamber is pressurized by a purge gas discharged from a first adsorption bed to move a second product gas chamber in a closed state of an on/off valve in a pressure boosting unit of a gas concentration device according to an embodiment of the pressure invention. A process of FIG. 5 is performed after the process of FIG. 4, and during transition from the state of FIG. 4 to the state of FIG. 5, oxygen in the pressure boosting unit 70 is pressurized again. During this process the on/off valve 91 is controlled to be off.

In detail, FIG. 5 shows a state in which nitrogen discharged from the first adsorption bed 11 has been fed into the first and the second purge gas chambers 71b and 72b, and the first to third pistons 171, 172 and 173 are located at a top dead point. That is, nitrogen is supplied to the first and the second purge gas chambers 71b and 72b via the purge gas feeding passages 81 and 82 after the process of FIG. 4, so the first to third pistons 171, 172 and 173 moves upwardly by the pressure of nitrogen to reach the point shown in FIG. 5. During this process, the on/off valve 91 is controlled to be off. At this time, a nitrogen desorption process is performed in the first adsorption bed 11 and a nitrogen adsorption process is performed in the second adsorption bed 13.

Accordingly, while the first to third pistons 171, 172 and 173 move upwardly during the transition from the state of FIG. 4 to the state of FIG. 5, the oxygen in the first product gas chamber 71a is pressurized, and the oxygen which is being pressurized is urged to move to the second product gas chamber 73b.

Figure 6:
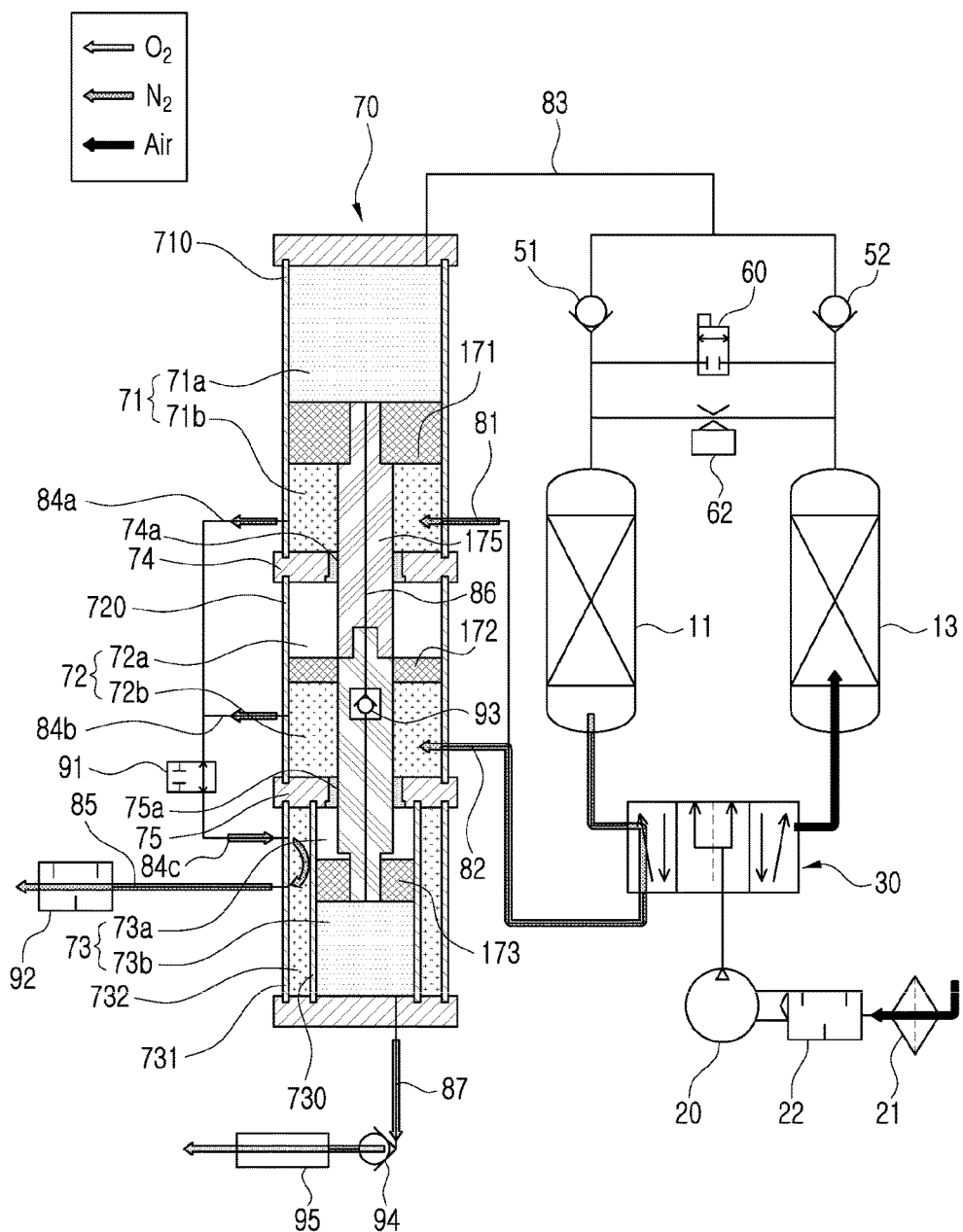
FIG. 6 is a drawing showing a state in which a purge gas is partially discharged by a pressure of a product gas of a first product gas chamber in an open state of an on/off valve in a pressure boosting unit of a gas concentration device according to an embodiment of the pressure invention.

FIG. 6 is a drawing showing a state in which a purge gas is partially discharged by a pressure of a product gas of a first product gas chamber in an open state of an on/off valve in a pressure boosting unit of a gas concentration device according to an embodiment of the pressure invention. The state of FIG. 6 is performed after the state of FIG. 5, and during the transition from the state of FIG. 5 to the state of FIG. 6, a portion of the purge gas in the first and the second purge gas chambers 71b and 72b moves to the third purge gas chamber 732 and a portion of the purge gas may be discharged to the outside via the purge gas discharging passage 85.

If the on/off valve 91 becomes open at the state of FIG. 5, the balance of forces acting on the pistons 171, 172 and 173 by the product gas and the purge gas collapses, so the pistons 171, 172 and 173 move downwardly by the pressure of the product gas and thereby a portion of the purge gas is discharged to the outside. At this time, the product gas in the second product gas chamber 73b is also pressurized by the movement of the pistons 171, 172 and 173, so a portion thereof may be discharged to the outside via the product gas discharging passage 87. During the transition from the state of FIG. 5 to the state of FIG. 6, a nitrogen desorption process may be performed in the first adsorption bed 11, and a portion of nitrogen remaining in the first adsorption bed 11 may move to the first and the second nitrogen gas chambers 71*b* and 72*b* due to pressure change.

FIG. 7 is a drawing showing a state in which a purge gas and a product gas of a second product gas chamber is pressurized by a product gas which is discharged from a second adsorption bed to be discharged in an open state of an on/off valve in a pressure boosting unit of a gas concentration device according to an embodiment of the pressure invention. The state of FIG. 7 is performed after the state of FIG. 6, and during transition from the state of FIG. 6 to the state of FIG. 7 nitrogen of the pressure boosting unit 70 is discharged and the pressurized oxygen moves to the oxygen tank 95. During this process, the on/off valve 91 is controlled to be on.

In detail, FIG. 7 shows a state in which oxygen discharged from the first adsorption bed 11 has been supplied to the first product gas chamber 71*a*, and the first to third pistons 171, 172 and 173 are located at a bottom dead point. If oxygen is discharged from the second adsorption bed 13 at the state of FIG. 6, oxygen pressure of the first product gas chamber 71*a* increases, and thus the force due to oxygen pressure becomes greater than the force due to nitrogen pressure so that the first to third pistons 171, 172 and 173 move downwardly to reach the state of FIG. 7. During this process the on/off valve 91 is maintained to be on, so nitrogen is discharged via the purge gas discharging passage 85 and oxygen in the second product gas chamber 73*b* is pressurized so as to be discharged via the product gas discharging passage 87 to the oxygen tank 95.

At this time, as shown in FIG. 1, a diameter of the third cylinder bore 73 may be less than a diameter of the first cylinder bore 71, and thereby oxygen can be further pressurized by the third piston 173.

By repeatedly performing the above-described processes, the pressure of the product gas (oxygen) can be increased by the pressure of the purge gas (nitrogen).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gas concentration device comprising:
    an air supplier supplying pressurized air;
    a plurality of adsorption beds which separate pressurized air supplied from the air supplier into product gas and purge gas by a pressure swing adsorption method and discharge the separated product gas and purge gas;
    a flow passage regulating valve unit which regulates flow passages so as to allow the pressurized air to be supplied to the adsorption bed from the air supplier and so as to reduce pressure of the adsorption bed so that a nitrogen adsorption process and a nitrogen desorption process are alternately performed; and
    a pressure boosting unit which is configured to be fed with the purge gas and the product gas discharged from the adsorption bed and is configured to pressurize the product gas in multi-stage sequentially using the purge gas and the product gas.

2. The gas concentration device of claim 1, wherein the pressure boosting unit comprises:
    a first cylinder, a second cylinder and a third cylinder respectively defining a first cylinder bore, a second cylinder bore and a third cylinder bore which are sequentially disposed;
    a first piston, a second piston and a third piston which are respectively movably disposed in the first cylinder bore, the second cylinder bore and the third cylinder bore and are connected to one another so as to move together;
    a purge gas discharging passage for discharging the purge gas;
    an on/off valve for selectively allowing discharging of the purge gas depending on an on/off state thereof; and
    a product gas discharging passage for discharging the product gas,
    wherein the first cylinder bore is configured to be fed respectively with the product gas and the purge gas in both spaces disposed on both sides of the first piston;
    wherein the second cylinder bore is configured to be fed with the purge gas in one of both spaces disposed on both sides of the second piston; and
    wherein the third cylinder bore is configured to be fed with the pressurized product gas supplied from the first cylinder bore and to discharge the supplied product gas.

3. The gas concentration device of claim 2, wherein the first piston is configured to partition the first cylinder bore to form a first product gas chamber into which the product gas is fed and a first purge gas chamber into which the purge gas is fed,
    wherein the second piston is configured to partition the second cylinder bore to form a second purge gas chamber into which the purge gas is fed, and
    wherein the third piston is configured to partition the third cylinder bore to form a second product gas chamber into which the product gas from the first product gas chamber is fed.

4. The gas concentration device of claim 3, wherein the plurality of adsorption beds comprise a first adsorption bed and a second adsorption bed,
    wherein the pressure boosting unit operates to repeatedly perform multi-staged pressurization process comprising:
    a process that the product gas in the first product gas chamber is pressurized by a force acting on the first and second pistons by the purge gas discharged from the second adsorption bed in an off state of the on/off valve so as to move to the second product gas chamber;
    a process that a portion of the purge gas is discharged by a pressure of the product gas in the first product gas chamber, which is supplied from the second adsorption bed, in an on state of the on/off valve and the product gas in the second product gas chamber is pressurized so as to be partially discharged;
    a process that the product gas in the second product gas chamber is pressurized by a force acting on the first piston by the product gas discharged from the first adsorption bed in an on state of the on/off valve so as to be discharged and at the same time the purge gas in the first and second purge gas chambers is discharged;
    a process that the product gas in the first product gas chamber is pressurized by a force acting on the first and second pistons by the purge gas discharged from the first adsorption bed in an off state of the on/off valve so as to move to the second product gas chamber;

a process that a portion of the purge gas is discharged by a pressure of the product gas in the first product gas chamber, which is supplied from the first adsorption bed, in an on state of the on/off valve and the product gas in the second product gas chamber is pressurized so as to be partially discharged; and a process that the product gas in the second product gas chamber is pressurized by a force acting on the first piston by the product gas discharged from the second adsorption bed in an on state of the on/off valve so as to be discharged and at the same time the purge gas in the first and second purge gas chambers is discharged.

5. The gas concentration device of claim 3, wherein the first to third pistons are connected to one another by a piston rod, and wherein the piston rod defines a product gas moving passage through which the product gas discharged from the first product gas chamber moves to the second product gas chamber.

6. The gas concentration device of claim 3, wherein the pressure boosting unit further comprises:
an external cylinder surrounding the third cylinder so as to form a third purge gas chamber around the third cylinder;
a first purge gas moving passage connected to the first purge gas chamber; and
a second purge gas moving passage connected to the second purge gas chamber,
wherein the purge gas discharging passage is connected to the third purge gas chamber.

7. The gas concentration device of claim 6, wherein the first and second purge gas moving passages are merged to form a third purge gas moving passage, and wherein the on/off valve is installed in the third purge gas moving passage.

8. The gas concentration device of claim 5, wherein the pressure boosting unit further comprises a check valve which is installed in the product gas moving passage to allow the product gas to flow from the first product gas chamber to the second product gas chamber while preventing the product gas from flowing in an opposite direction.

9. The gas concentration device of claim 2, wherein a diameter of the third cylinder is less than a diameter of the first cylinder.

10. The gas concentration device of claim 2, wherein the first piston and the second piston are configured such that a force acting on the first piston and the second piston by the pressure of the purge gas is greater than a force acting on the first piston by the pressure of the product gas.

11. A gas concentration device comprising:
an air supplier supplying pressurized air;
a plurality of adsorption beds which separate pressurized air supplied from the air supplier into product gas and purge gas by a pressure swing adsorption method and discharge the separated product gas and purge gas;
a flow passage regulating valve unit which regulates flow passages so as to allow the pressurized air to be supplied to the adsorption bed from the air supplier and so as to reduce pressure of the adsorption bed so that a nitrogen adsorption process and a nitrogen desorption process are alternately performed; and
a pressure boosting unit which is configured to be fed with the purge gas and the product gas discharged from the adsorption bed and is configured to pressurize the product gas in multi-stage sequentially using the purge gas and the product gas,
wherein the pressure boosting unit comprises: a first cylinder, a second cylinder and a third cylinder respectively defining a first cylinder bore, a second cylinder bore and a third cylinder bore which are sequentially disposed; and a first piston, a second piston and a third piston which are respectively movably disposed in the first cylinder bore, the second cylinder bore and the third cylinder bore and are connected to one another so as to move together,
wherein the first cylinder bore is configured to be fed respectively with the product gas and the purge gas in both spaces disposed on both sides of the first piston, wherein the second cylinder bore is configured to be fed with the purge gas in one of both spaces disposed on both sides of the second piston, and wherein the third cylinder bore is configured to be fed with the pressurized product gas supplied from the first cylinder bore and to discharge the supplied product gas,
wherein the first piston is configured to partition the first cylinder bore to form a first product gas chamber into which the product gas is fed and a first purge gas chamber into which the purge gas is fed, wherein the second piston is configured to partition the second cylinder bore to form a second purge gas chamber into which the purge gas is fed, and wherein the third piston is configured to partition the third cylinder bore to form a second product gas chamber into which the product gas from the first product gas chamber is fed,
wherein the pressure boosting unit further comprises: an external cylinder surrounding the third cylinder so as to form a third purge gas chamber around the third cylinder; a first purge gas moving passage connected to the first purge gas chamber; a second purge gas moving passage connected to the second purge gas chamber; an on/off valve which selectively allows the purge gas to flow from the first and second purge gas moving passages; and a third purge gas moving passage connecting the on/off valve and the third purge gas chamber; and a purge gas discharging passage through which the purge gas discharged from the third purge gas chamber flows,
wherein the plurality of adsorption beds comprises a first adsorption bed and a second adsorption bed, and
wherein the pressure boosting unit operates to repeatedly perform multi-staged pressurization process comprising:
a process that the product gas in the first product gas chamber is pressurized by a force acting on the first and second pistons by the purge gas discharged from the second adsorption bed in an off state of the on/off valve so as to move to the second product gas chamber;
a process that a portion of the purge gas is discharged by a pressure of the product gas in the first product gas chamber, which is supplied from the second adsorption bed, in an on state of the on/off valve and the product gas in the second product gas chamber is pressurized so as to be partially discharged;
a process that the product gas in the second product gas chamber is pressurized by a force acting on the first piston by the product gas discharged from the first adsorption bed in an on state of the on/off valve so as to be discharged and at the same time the purge gas in the first and second purge gas chambers is discharged;
a process that the product gas in the first product gas chamber is pressurized by a force acting on the first and second pistons by the purge gas discharged from the first adsorption bed in an off state of the on/off valve so as to move to the second product gas chamber;

a process that a portion of the purge gas is discharged by a pressure of the product gas in the first product gas chamber, which is supplied from the first adsorption bed, in an on state of the on/off valve and the product gas in the second product gas chamber is pressurized so as to be partially discharged; and a process that the product gas in the second product gas chamber is pressurized by a force acting on the first piston by the product gas discharged from the second adsorption bed in an on state of the on/off valve so as to be discharged and at the same time the purge gas in the first and second purge gas chambers is discharged.

* * * * *